United States Patent
Lutz et al.

(10) Patent No.: US 10,509,382 B2
(45) Date of Patent: Dec. 17, 2019

(54) DECENTRALIZED PERIPHERAL WITH WHICH SIMULATION FUNCTIONS ARE IMPLEMENTED IN AN EXISTING COMPONENT OF AN AUTOMATION FACILITY

(71) Applicant: Siemens Aktiengesellschaft, Munich (DE)

(72) Inventors: Benjamin Lutz, Pfinztal (DE); Gerrit Wolf, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 185 days.

(21) Appl. No.: 15/255,432

(22) Filed: Sep. 2, 2016

(65) Prior Publication Data
US 2017/0068232 A1     Mar. 9, 2017

(30) Foreign Application Priority Data

Sep. 9, 2015 (EP) .................................. 15184517

(51) Int. Cl.
*G05B 19/42* (2006.01)
*G05B 19/042* (2006.01)
(Continued)

(52) U.S. Cl.
CPC ....... *G05B 19/0426* (2013.01); *G06F 3/0484* (2013.01); *G06F 9/455* (2013.01);
(Continued)

(58) Field of Classification Search
CPC ... G05B 19/0426; G06F 3/0484; G06F 9/455; G06F 13/385
See application file for complete search history.

(56) References Cited

U.S. PATENT DOCUMENTS 4,314,354 A * 2/1982 Felder .................. G05B 19/054
700/9
2004/0015244 A1 1/2004 Fujinami et al.
(Continued)

FOREIGN PATENT DOCUMENTS

DE          10223158       12/2002
DE        102010020279       3/2011
(Continued)

OTHER PUBLICATIONS

Chen, Jing et al.: "An object-oriented framework for modular chemical process simulation with semiconductor processing applications", Computers and Chemical Engineering 30 (2006), Jun. 9, 2006; Elsevier, 2006.
(Continued)

*Primary Examiner* — Wissam Rashid
(74) *Attorney, Agent, or Firm* — Cozen O'Connor

(57) ABSTRACT

A decentralized peripheral having process input and process output modules which, in a process control mode of operation, interact with field devices connected to these modules, and having an interface module in which a process image is stored, wherein in the process control mode of operation the process input modules write process input values for processing via an automation device connected to the decentralized peripheral into the process image, and the automation device writes process output values for processing via the process output modules into the process image such that as real a behavior as possible of this decentralized peripheral can be simulated.

4 Claims, 4 Drawing Sheets

(51) Int. Cl.
*G06F 13/38* (2006.01)
*G06F 3/0484* (2013.01)
*G06F 9/455* (2018.01)

(52) U.S. Cl.
CPC .. *G06F 13/385* (2013.01); *G05B 2219/23445* (2013.01); *G05B 2219/23446* (2013.01)

(56) References Cited

U.S. PATENT DOCUMENTS

| | | | |
|---|---|---|---|
| 2007/0288674 A1 | 12/2007 | Ikeno | |
| 2010/0287255 A1* | 11/2010 | Biedermann | G05B 19/042 |
| | | | 709/208 |
| 2011/0046749 A1 | 2/2011 | Saito | |
| 2013/0166784 A1* | 6/2013 | Baik | G06F 15/177 |
| | | | 710/8 |
| 2015/0019191 A1* | 1/2015 | Maturana | G05B 17/02 |
| | | | 703/13 |

FOREIGN PATENT DOCUMENTS

| | | |
|---|---|---|
| DE | 102010027286 | 1/2012 |
| EP | 2985663 | 2/2006 |
| EP | 2498156 A2 | 9/2012 |
| WO | WO 2014/111417 | 7/2014 |

OTHER PUBLICATIONS

Siemens AG, "Prozessleitsystem SIMATIC PCS 7" Catalog; 2014; Systemkomponenten; 2014.

* cited by examiner

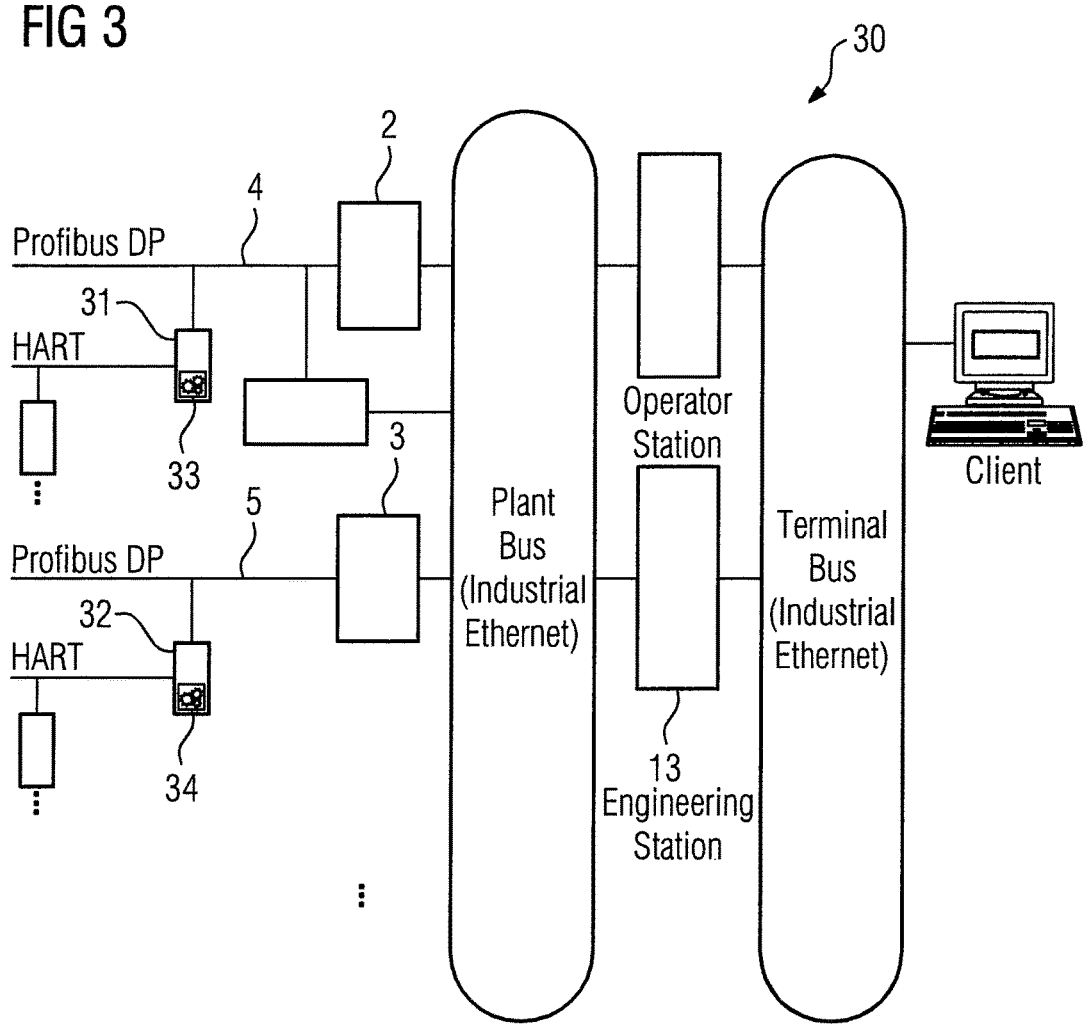

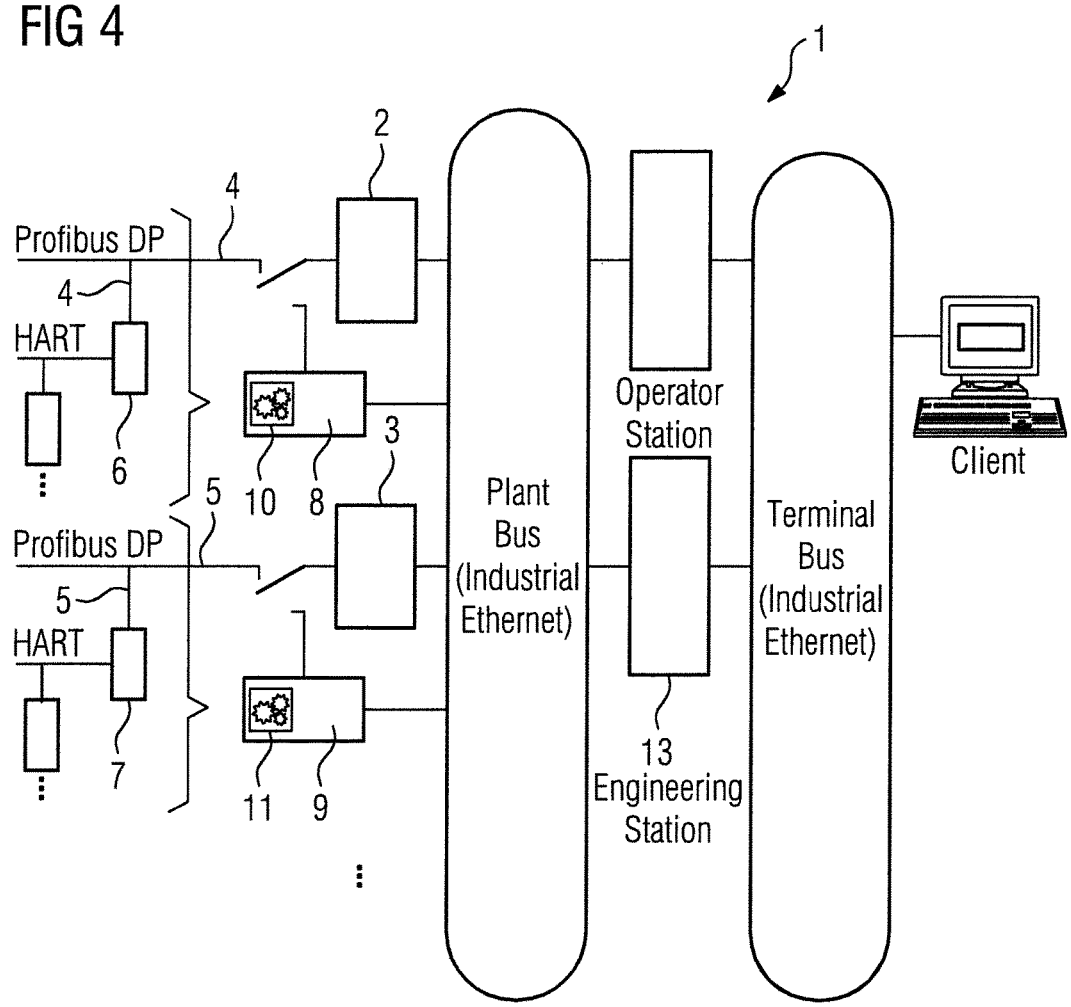

DECENTRALIZED PERIPHERAL WITH WHICH SIMULATION FUNCTIONS ARE IMPLEMENTED IN AN EXISTING COMPONENT OF AN AUTOMATION FACILITY

BACKGROUND OF THE INVENTION

1. Field of the Invention

The invention relates to a decentralized peripheral having process input and process output modules which, in a process control mode of operation, interact with field devices connected to these modules, and having an interface module, in which a process image is stored, where in a process control mode of operation the process input modules write process input values for processing, via an automation device connected to the decentralized peripheral, into the process image and the automation device writes process output values for processing via the process output modules into the process image.

2. Description of the Related Art

Siemens catalog ST PCS 7, 2014/2015 edition, chapter 11 discloses a decentralized peripheral, which is marketed as what are known as remote I/O stations under the name ET 200iSP, ET 200M or ET 200SP by the applicant. This conventional decentralized peripheral has a plurality of process input and process output assemblies which, in the process control mode of operation, interact with field devices (e.g., sensors or actuators) connected to these assemblies. Furthermore, the decentralized peripheral is provided with an interface assembly which, on the one hand, communicates via a backplane bus with the process input and process output assemblies and, on the other hand, is provided for connection to a decentralized field bus designed for high communication speeds, such as a conventional "PROFIBUS DP" field. By way of this field bus the interface assembly communicates with a superordinate automation device, which receives process input values (actual values of sensors) from this interface assembly, processes these values in accordance with a control program and finally generates process output values (target values) for actuators.

A simulation of the behavior of a decentralized peripheral is frequently desirable in order thus to be able to simulate an automation facility for test purposes. To this end, a simulation assembly is provided, for instance, by which a real-time simulation of a decentralized peripheral is effected, where signal curves or reactive signal models are implemented on such a simulation assembly, for example. Due to the fact that an automation facility or a control system has a plurality of decentralized peripherals, a plurality of simulation assemblies of this type is required for the cited simulation. The hardware configuration of the automation facility must be adjusted accordingly because, instead of the decentralized peripherals, the simulation assemblies are connected to the field bus for communication with the automation device. Furthermore, these simulation assemblies are to be communicatively connected to an engineering system in order to project-plan, parameterize and configure these assemblies.

US 2015/0019191 A1 discloses measures for connecting a cloud-based simulation with a virtual controller.

SUMMARY OF THE INVENTION

It is an object of the invention to provide a decentralized peripheral that is suitable for simulation purposes. It is also an object to provide an automation facility having at least one decentralized peripheral by which the behavior of an automation facility can be easily simulated.

These and other objects and advantages are achieved in accordance with the invention by a decentralized peripheral and automation facility in which simulation functions are advantageously implemented in an existing component of the automation facility (a component in the form of the decentralized peripheral). On account of this integral design of a device simulation model in the existing component of the automation facility, a simulation can be effected without changing the hardware configuration. With the automation device or an engineering system of the automation facility, it is possible to seamlessly and above all also continuously switch between the real operation of the decentralized peripheral (field device operation) and the simulation of the decentralized peripheral via a definable and downloadable software setting.

In one embodiment of the invention, the interface module has a simulation script for calling up simulation basic components realized using hardware and/or software, where the simulation basic components represent simulation models for the process input and/or process output modules. The simulation script that can be loaded into the programmable element by way of mechanisms known per se comprises a description in instruction form, which indicates or specifies, for instance, which simulation basic components are called up in which sequence with which parameters, in order to realize a device simulation. Suitable simulation basic components contain ramp functions, delay elements, computing operations, noise signals and programmed sequences, for instance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in greater detail below on the basis of the drawing in which an exemplary embodiment of the invention is illustrated, and in which:

FIGS. 3 and 4 show automation facilities in accordance with the invention.

DETAILED DESCRIPTION OF THE EXEMPLARY EMBODIMENTS

Figure 1:
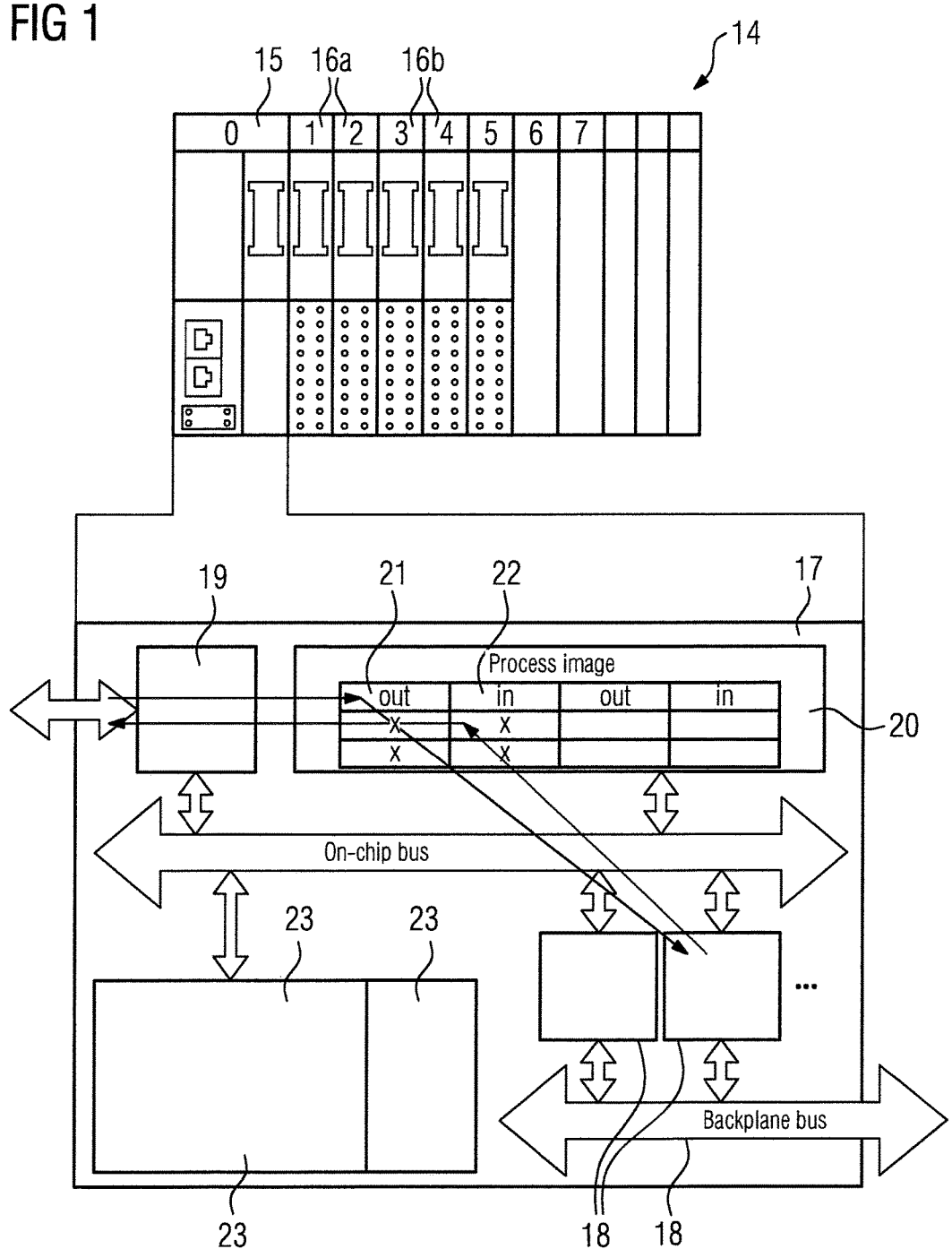
FIG. 1 shows a decentralized peripheral in accordance with the invention.

The same parts shown in FIGS. 1 to 4 are provided with the same reference characters.

With reference to FIG. 4, in which component parts of an automation facility 1 known per se are shown, the automation facility 1 has automation devices 2, 3, which are each connected via a field bus 4, 5 to a decentralized peripheral 6, 7. Each of these decentralized peripherals 6, 7 is provided with an interface assembly and with a plurality of process input and process output assemblies, where sensors and actuators are connected to the respective process input assemblies and to the respective process output assemblies in each instance.

The interface assembly of the decentralized peripheral 6 communicates with the superordinate automation device 2 via the field bus 4. By way of this interface module, the automation device 2 receives process input values from the sensors that are connected to the process input assemblies of the decentralized peripheral 6. The process input values process a control program that can run on the automation device 2, where the control program generates process output values for the actuators connected to the process output assemblies of the decentralized peripheral 6 from these process input values. The interface assembly of the decentralized peripheral 7 communicates correspondingly via the field bus 5 with the automation device 3. Both the process input values and also the process output values are first stored prior to a transmission in a process image of the respective decentralized peripheral 6, 7, where the transmission of the process input values from the respective decentralized peripheral 6, 7 to the respective automation device 2, 3 and the transmission of the process output values from the respective automation device 2, 3 to the decentralized peripheral 6, 7 takes place via a suitable field bus protocol.

In order to be able to simulate as real a behavior of the system or the automation facility 1 as possible prior to the actual process control operation, simulation assemblies 8, 9 are used, which simulate the real and subordinate decentralized peripherals 6, 7 in order thus to be able to stimulate the automation facility 1 for test purposes. In these simulation assemblies 8, 9, simple signal curves or reactive signal models are implemented, for instance, which is indicated in the drawing using reference characters 10, 11. The integration of these assemblies 8, 9 in the automation facility signifies a change in the hardware configuration of the automation facility 1 or the system, because during a simulation operation the assemblies 8, 9 are connected to the respective field bus 5, 6 instead of the decentralized peripherals 6, 7 which is indicated in the drawing by curly brackets and switches. During this simulation operation, the simulation assemblies 8, 9 communicate with the automation devices 2, 3 via the field buses 4, 5 and via a system bus with an engineering system 13, which is provided to parameterize and download the simulation configuration into the simulation assemblies 8, 9.

To dispense with simulation assemblies and to be able to use a decentralized peripheral usually "only" provided for process control tasks also for simulation purposes, the interface module of this decentralized peripheral has a programmable element. This element is embodied to block the access of the process input and process output modules to the process image in a simulation mode of operation, and also to read process output values of the automation device out of the process image, to calculate simulated process input values and to write the simulated process input values into the process image.

Figure 2:
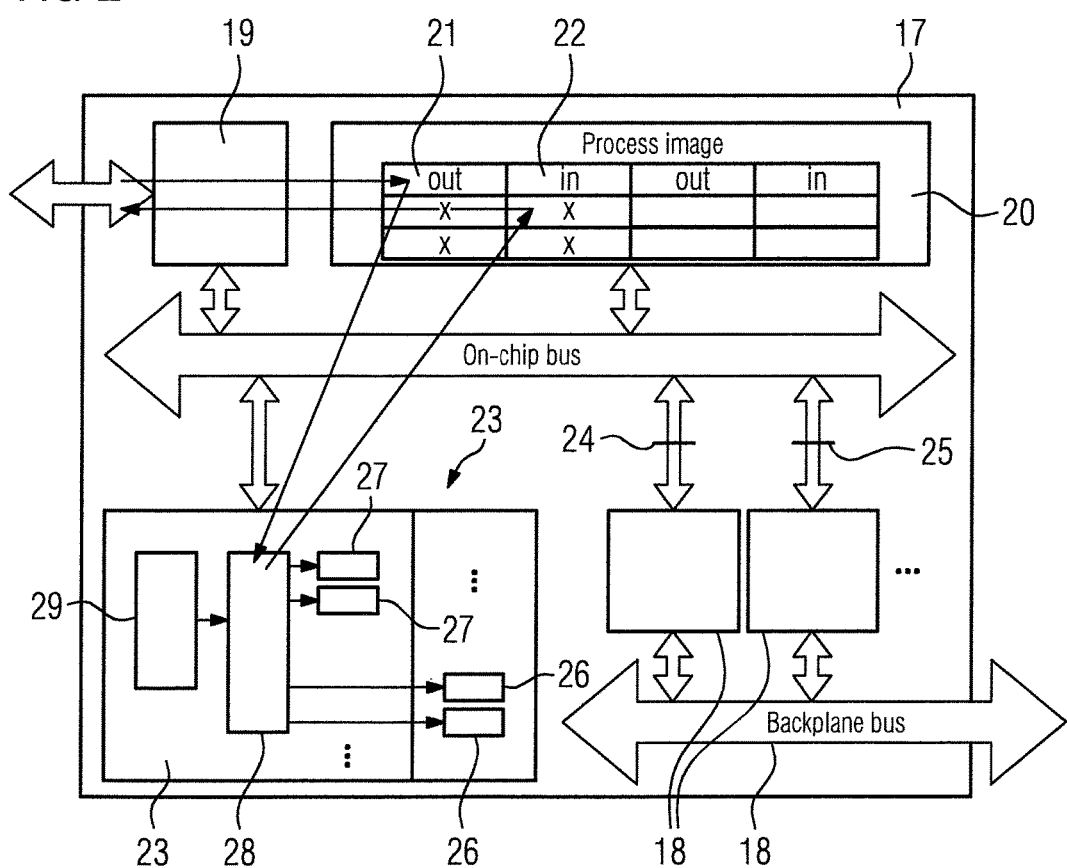
FIG. 2 shows an interface assembly in accordance with the invention.

For a more detailed explanation of the functionality and mode of operation of such a decentralized peripheral, reference is made below to FIGS. 1 and 2.

A decentralized peripheral 14 has an interface assembly 15 and a plurality of signal assemblies (process input assemblies 16a, process output assemblies 16b), which are connected by way of a backplane bus to the interface assembly 15 in order to exchange information. The interface assembly 15 is provided with a programmable element 17, e.g., a programmable element in the form of a FPGA element (Field Programmable Gate Array), which is connected or coupled via a suitable bus interface 18 to the backplane bus of the decentralized peripheral 14 and to a further bus interface 19 with the field bus 5, 6 (FIG. 4). A process image 20 is stored in the programmable element 17, where during a process control mode of operation process output values 21 transmitted by the automation device 2, 3 for the process output assemblies 16b and process input values 22 transmitted by the process input modules 16a for the automation device 2, 3 are written into the process image 20. In the drawing, the data flow from and to the process image 20 is shown via corresponding arrows.

In order to simulate as real a behavior of the decentralized peripheral 14 as possible and to be able to stimulate the automation facility for test purposes, the decentralized peripheral 14 is switched into a simulation mode of operation via the automation device 2, 3 or via the engineering system 13, for instance. In this simulation mode of operation, a central processing unit (CPU) 23 of the programmable element 17 of the interface assembly 15 first "deactivates" the signal assemblies, which otherwise, during the process control mode of operation, would exchange signals or process input and process output values via the process image 20. The deactivation occurs in a manner in which the CPU 23 blocks the read and write accesses of the signal assemblies, which is illustrated in the drawing by lines 24, 25 on the bus link. Then the CPU 3 reads the process output values 21 (control values of the actuators) stored by the automation device 2, 3 in the process image 20, processes these values 21 in accordance with simulation basic components, which represent simulation models of the signal assemblies, and finally writes the calculated (simulated) values as process input values 22 directly into the process image 20. The CPU 23 can define bypasses in an assembly-specific manner, as a result of which a flexible mixed mode is possible. This means that either a simulation model of a signal assembly of the decentralized peripheral or the real signal assembly itself can be operated. A flexible and continuous initial use of the real signal assemblies is thus possible, where a direct comparison is in particular also possible by seamlessly switching over between a real signal assembly and a signal assembly simulated at this signal assembly.

Depending on the requirement with respect to speed and real-time capability, the simulation basic components are embodied as hardware or software components 26, 27. The simulation basic components 27 realized using software, such as a signal generator or an arithmetic functional unit (adder, subtracter, . . . ), represent software functions that are loaded into the CPU 23 and can be called up herefrom. The simulation basic components 26 realized using hardware, such as in the form of a noise generator and a PT1 path, are embodied as digital hardware components (IP-core in the element 17), which supplement the "instruction set" of the CPU 23 and can be called up by a simulation interpreter 28 of the element 17 like a software function. This simulation interpreter 28 realizes a software in the CPU 23 of the element 17, which reads a simulation script 29 and embodies read-out instructions accordingly. Such instructions are for instance a) Var a=Read(process image, OUT_1);

A process output value (control value) for actuator (motor, valve) is read in the decentralized peripheral into a local variable;

b) IN_1=call(PT1_path,a);

With the control value, a simulation model PT1_path is called up by CPU instruction and a simulated process input value (sensor value) is calculated;

c) Write (process image, IN_1);

The simulated process input value is written into the process image 20 of the decentralized peripheral and can be read by the automation device 2, 3.

The simulation script 29, which is loaded into the CPU 23, describes which simulation basic components and in which sequence these components are called up and with which parameters the components are supplied, in order to realize a simulation of the signal assemblies. The simulation basic components contain, e.g., ramp functions, delay elements, computing operations, noise signals or programmed sequences.

As a result of simulation functions being implemented in the existing decentralized peripheral of the automation facility, the simulation of the peripheral can be effected without additional simulation modules and without changing the hardware configuration.

FIG. 3 shows an automation facility 30, which has two decentralized peripherals 31, 32 with integrated simulation functionality, which is indicated in the drawing with reference characters 33, 34. With the automation device 2, 3 or the engineering system 13 of the automation facility 30, it is possible to switch between the real operation of the decentralized peripheral (field devices operation) 31, 32 and the simulation of the decentralized peripheral 31, 32 via a definable and downloadable software setting.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A decentralized peripheral comprising:
a central processor;
process input modules and process output modules which, in a process control mode of operation, interact with field devices connected to said process input modules and process output modules, and
an interface module, in which a process image comprising process input and output values of sensors and actuators is stored, in a process control mode of operation the process input models writing process input values for processing, via an automation device connected to the decentralized peripheral, into the process image comprising process input and output values of sensors and actuators, and the automation device writes process output values for processing, via the process output modules, into the process image comprising process input and output values of sensors and actuators;
wherein the interface module includes a programmable element which is configured, in a simulation mode of operation, to block access of the process input modules and process output modules to the process image comprising process input and output values of sensors and actuators, permit reading of process output values of the automation device out of the process image comprising process input and output values of sensors and actuators by the central processor, calculate simulated process input values and to write the simulated process input values into the process image comprising process input and output values of sensors and actuators.

2. The decentralized peripheral as claimed in claim 1, wherein the interface module includes a simulation script for calling up simulation basic components realized utilizing at least one of (i) hardware and (ii) software; and wherein the simulation basic components represent simulation models for at least of one of (i) the process input modules and (ii) the process output modules.

3. An automation facility comprising:
at least one automation device; and
at least one decentralized peripheral comprising:
a central processor;
process input modules and process output modules which, in a process control mode of operation, interact with field devices connected to said process input modules and process output modules, and
an interface module, in which a process image comprising process input and output values of sensors and actuators is stored, in a process control mode of operation the process input models writing process input values for processing, via an automation device connected to the decentralized peripheral, into the process image comprising process input and output values of sensors and actuators, and the automation device writes process output values for processing, via the process output modules, into the process image comprising process input and output values of sensors and actuators;
wherein the interface module includes a programmable element which is configured, in a simulation mode of operation, to block access of the process input modules and process output modules to the process image comprising process input and output values of sensors and actuators, permit reading of process output values of the automation device out of the process image comprising process input and output values of sensors and actuators by the central processor, calculate simulated process input values and to write the simulated process input values into the process image comprising process input and output values of sensors and actuators.

4. An automation facility comprising:
at least one automation device; and
at least one decentralized peripheral comprising:
a central processor;
process input modules and process output modules which, in a process control mode of operation, interact with field devices connected to said process input modules and process output modules, and
an interface module, in which a process image comprising process input and output values of sensors and actuators is stored, in a process control mode of operation the process input models writing process input values for processing, via an automation device connected to the decentralized peripheral, into the process image comprising process input and output values of sensors and actuators, and the automation device writes process output values for processing, via the process output modules, into the process image comprising process input and output values of sensors and actuators;

wherein the interface module includes a programmable element which is configured, in a simulation mode of operation, to block access of the process input modules and process output modules to the process image comprising process input and output values of sensors and actuators, permit reading of process output values of the automation device out of the process image comprising process input and output values of sensors and actuators by the central processor, calculate simulated process input values and to write the simulated process input values into the process image comprising process input and output values of sensors and actuators;

wherein the interface module includes a simulation script for calling up simulation basic components realized utilizing at least one of (i) hardware and (ii) software; and wherein the simulation basic components represent simulation models for at least of one of (i) the process input modules and (ii) the process output modules.

* * * * *